United States Patent [19]

Counterman

[11] Patent Number: 5,648,958
[45] Date of Patent: Jul. 15, 1997

[54] SYSTEM AND METHOD FOR CONTROLLING ACCESS TO A SHARED CHANNEL FOR CELL TRANSMISSION IN SHARED MEDIA NETWORKS

[75] Inventor: Raymond C. Counterman, Canton, Mass.

[73] Assignee: GTE Laboratories Incorporated, Waltham, Mass.

[21] Appl. No.: 417,294

[22] Filed: Apr. 5, 1995

[51] Int. Cl.$^6$ .................................................. H04J 3/16
[52] U.S. Cl. .......................... 370/458; 370/462; 370/437
[58] Field of Search ............................ 370/85.7, 95.1, 370/95.2, 95.3, 60.1, 60, 85.9, 85.2, 85.3, 94.2, 94.1, 79, 110.1, 458, 462, 437, 220, 432, 442; 455/3.1, 5.1

[56] References Cited

U.S. PATENT DOCUMENTS

| | | | |
|---|---|---|---|
| 5,331,316 | 7/1994 | Mestdagh et al. | 370/85.7 |
| 5,402,422 | 3/1995 | Liu et al. | 370/85.2 |
| 5,421,030 | 5/1995 | Baran | 455/5.1 |
| 5,425,027 | 6/1995 | Baran | 370/94.2 |

*Primary Examiner*—Wellington Chin
*Assistant Examiner*—Huy D. Vu
*Attorney, Agent, or Firm*—Leonard C. Suchyta

[57] ABSTRACT

A system and method for controlling access to a shared channel for cell transmission in a shared medium network, wherein the shared medium distribution portion of said network extends from a node to a plurality of terminals within a community, having a tree-and-branch bus topology, has a downstream broadcast channel from said node to all terminals on said distribution network; a shared upstream channel from all of said terminals to said node; and a network controller at said node for central control of access of media transmissions from said terminals over said upstream channel. Media access control protocols reside in said controller and in said terminals. An asynchronous transmission mode (ATM) network element with said controller has ATM shared channel protocols to provide dynamic bandwidth allocation of said upstream channel. The system grants access to said shared upstream channel to any of said terminals utilizing a plurality of multiplexing modes of operation. A media access control cell with protocol control information is periodically inserted within broadcasts by said ATM network element on said downstream channel of said distribution portion of said network to said terminals, utilizing an ATM slotted transmission format, and dividing the channels into frames and time slots within frames. Access to said upstream shared channel is multiplexed, using a plurality of modes of operation. A reservation mode of operation provides a deterministic time reservation for time multiplexing access by a terminal for a specific number of time slots in a specific frame. A contention mode of operation provides random access to said upstream channel by any terminal during an identifiable frame. Said controller dynamically allocates such frames to each of said modes of operation.

20 Claims, 14 Drawing Sheets

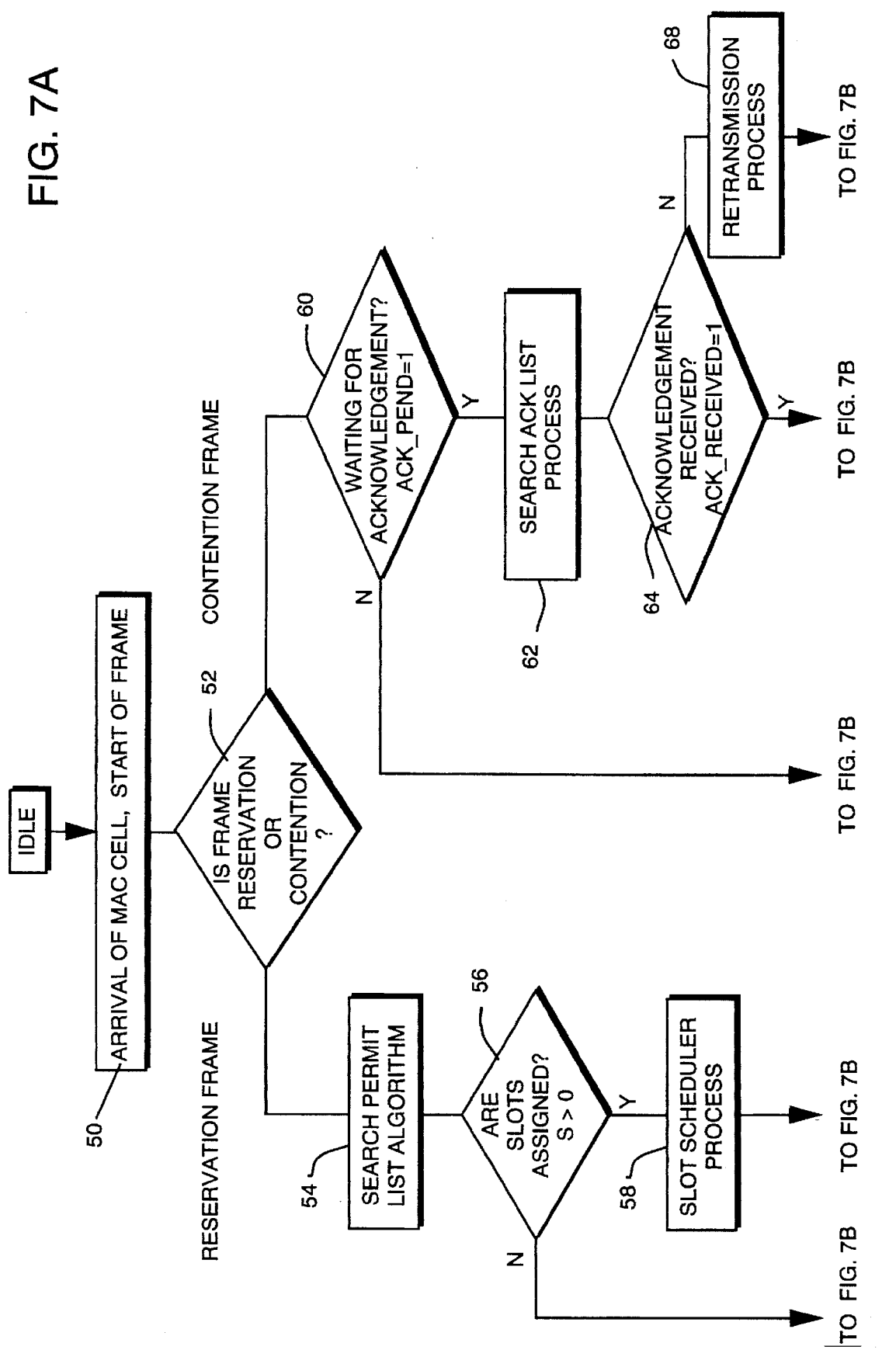

SYSTEM AND METHOD FOR CONTROLLING ACCESS TO A SHARED CHANNEL FOR CELL TRANSMISSION IN SHARED MEDIA NETWORKS

BACKGROUND OF THE INVENTION

1. Field Of The Invention

This invention relates generally to the field of communications, and more particularly to control architectures and associated access mechanisms relevant to providing integrated ATM-based services over a shared channel, shared media access network. Specifically, it pertains to a novel method for controlling shared channel access to an upstream channel for multimedia traffic utilizing ATM cell transmission in the shared media of an access network with a tree-and-branch bus topology, with dynamic bandwidth allocation in order to gain efficiency in bandwidth usage and flexibility in subscriber bandwidth allocation. An example of such a shared channel, shared media network is a hybrid fiber-and-coaxial cable network.

2. Description of the Prior Art

Alternate shared channel, shared media approaches grant channel access to a terminal's interface, thereby regulating the terminal's output regardless of the type of traffic, whether it is voice, video or data traffic. While this approach may be suitable for data-only access, it is problematic for access terminals that must transport a mix of voice, video, and data. Common shared channel, shared media networks do not use signaling protocols and do not create connections. This connectionless access, while good for local area networks, has limitations in meeting multimedia service requirements.

Fiber and coaxial cable architectures typical of the CATV industry are under consideration by telephone companies for providing video dialtone broadband services. The fiber/coax architecture may be desirable for providing both narrowband and broadband services. Plain old telephone services (POTS) and narrowband services (n times 64 Kbps) will be provided to each subscriber by allocating a portion of the serving area's bandwidth using a TDMA protocol. Other portions of the telephone companies' access bandwidth will be assigned to broadband video applications such as Cable TV, video-on-demand (VOD), and near-video-on-demand (NVOD). Dedicated channels become bandwidth limited, however, when emerging interactive applications are considered that require throughputs exceeding a few megabits per second for mixes of voice, image, data, or multimedia traffic. Shared channel access for these high bandwidth applications needs to be considered in order to gain efficiency in bandwidth usage and flexibility in subscriber bandwidth allocation.

There are two general approaches for interactive services that are applicable to the hybrid fiber/coax architecture with its shared coaxial medium for subscriber access. The first is a Broadband Metropolitan Area Network (MAN) approach that has evolved from the data communications industry. It has historically been used in traditional CATV-type cable facilities but may find use in the new fiber/coax architecture. Second, an emerging approach tailored to the architecture, uses TDMA for providing digital circuits composed of multiples of 64 Kbps. This is the approach being provided by the telecommunications industry for voice and data services over the fiber/coax network and is referred to here as the Telecom approach.

The Broadband MAN, (BB-MAN), is a metropolitan area network for connectionless data services on fiber/coax networks that uses random access protocols. The broadband MAN is created by frequency translating the upstream signals and broadcasting them downstream. This creates a bus-like appearance to terminals on the coaxial network. The network is intended for data services, and uses LAN technology such as bridges and routers to manage and route traffic.

A newer technology is evolving for use in the fiber/coax architecture. The basic approach is to provide transport of 64 Kbps digital circuits over the coaxial portion of the access network. These 64 Kbps circuits are time division multiplexed and broadcast to all home-mounted Network Interface Units (NIU) that interface subscribers to the network. Typically an NIU has at least one 64 Kbps circuit for providing voice service to a home's analog phones. The NIU's circuits are time division or frequency division multiple accessed onto an upstream channel. This technology provides a narrowband digital access typically with a rate of 64 Kbps and potentially up to about 1.5 Mbps per subscriber within the limits of the serving aread's total upstream bandwidth.

The principal disadvantages of the BB-MAN Approach is that it cannot guarantee the quality of service provided to a subscriber, such as average bandwidth. The access throughput is dependent on network load and its behavior cannot be easily controlled. In cases of heavy use, it could potentially provide a very low grade of service to data users. It has unacceptable performance for delay sensitive multimedia applications and services, and is better suited for e-mail-like data services. BB-MAN's random-access provides a subscriber fluctuating bandwidth as a result of the varying number of subscribers and their applications.

The principal disadvantage of the Telecom approach is that it uses a fixed bandwidth assignment and severely limits available subscriber bandwidth. Bandwidth is provided in multiples of 64 Kbps. The number of 64 Kbps circuits available is limited by the upstream channel bandwidth. This approach is very inefficient, for example, for data applications that tend to be bursty in nature, requiring high bandwidth for short periods of time. Applications that require a high burst rate, for example, 1.5 Mbps, would waste bandwidth if a connection rate of 1.5 Mbps is assigned for the entire call. The number of subscribers and their allowed bandwidth is limited, bounded by the serving area size, channel bandwidth, and the n ×64 Kbps bandwidth allocation used in this approach. An upper bound on a subscriber's available bandwidth is proportional to the shared channel bandwidth divided by the number of n ×64 Kbps circuits. For example, consider an upstream aggregate channel rate of 1.5 Mbps and twenty-three subscribers with 64 Kbps data connections. The twenty-fourth subscriber may only have up to 64 Kbps for his application that requires 100 Kbps.

The present invention is directed to the solution of two problems which persist in prior art situations. First, for telephone company provided multimedia services, the service provider will need the ability to manage access traffic and will need to provide quality of service controls and guarantees to the subscriber. Second, a problem for access control protocols with the control in the network is one of allowing access to a newly added terminal, or of reinitializing a terminal after a power failure.

Granting access to a network interface creates a problem for multimedia terminals that need to transmit a mix of voice, video, and data over the terminal's network interface. For shared media networks, such as local area networks, access is granted to the channel by a media access control protocol, MAC. The MAC grants channel access to a terminal's network interface, thereby regulating the terminal's output regardless of the type of traffic, for instance voice or data. For a network that has only one type of traffic, in this example data, this terminal access approach is adequate.

A problem exists, however, if the terminal is transporting mixed traffic types such as video, data, and voice. Each type of traffic from the terminal requires the access control function to provide a special transfer characteristic. Voice traffic requires a low delay access and data traffic requires a bursty access. The problem with prior media access control protocols that grant access to a terminal's network interface is that it restricts the effectiveness of traffic management. A terminal's data traffic could interfere with its voice or video traffic. Such terminal access protocols can not regulate the access based on the type of traffic and support multimedia service requirements.

A centrally controlled network has difficulty learning of newly added terminals (terminals that come on-line) or reinitialized terminals. The network cannot grant access to the upstream channel unless it knows of the terminal's existence and the state of the terminal. Such problems do not exist for random-access networks, for example an Ethernet network, in which a terminal may transmit at any time and announce itself to the network. A problem exists for time-reservation access networks that grant time in the channel, for instance, as in a TDMA network. The network assigns time-slots for established connections with known terminals.

The centrally controlled network must provide some form of terminal initiated transfer without the existence of a connection in the shared channel of the shared media. This connectionless access mechanism is needed for the integrated access described in this disclosure. This integrated access uses a portion of the coaxial cable's RF spectrum that is shared for the transport of ATM user, control, management, and signaling cells. For the special cases of, for example, a newly added or reinitialized terminal, there is no established connection between the terminal and the network (the controller). For these reasons a connectionless access mechanism is needed.

Other approaches to addressing the connectionless access problem require the network to know a finite address list of all terminals on the network. One approach is to periodically poll all terminals by sequencing though a terminal listing to bring new terminals on-line. This is not an efficient approach, because for a large list, much time is spent polling idle terminals.

A principal object of the present invention is to provide control architectures and associated access mechanisms relevant to providing integrated ATM-based services over shared channel, shared media access networks.

A further object of this invention is to address both the upstream traffic management and the connectionless access problems for ATM transmission in the upstream shared channel, by providing a connectionless access mechanism and a method for terminal initiated transfer.

It is a further object of this invention to provide that the service requirements for multimedia traffic, such as quality and rate, can be met.

It is still a further object of this invention to provide a novel method for controlling shared-channel access to an upstream channel for multimedia traffic utilizing ATM cell transmission in the shared media of an access network with a tree-and-branch bus topology, with dynamic bandwidth allocation in order to gain efficiency in bandwidth usage and flexibility in subscriber bandwidth allocation.

SUMMARY OF THE INVENTION

In a first aspect of the invention, a system for controlling access to a shared channel for cell transmission in a shared medium network, wherein the shared medium distribution portion of said network extends from a node to a plurality of terminals within a community, having a tree-and-branch bus topology, has a downstream broadcast channel from said node to all terminals on said distribution network; a shared upstream channel from all of said terminals to said node; and a network controller at said node for central control of access of media transmissions from said terminals over said upstream channel. Media access control protocols reside in said controller and in said terminals. An asynchronous transmission mode (ATM) network element at said node has ATM shared channel protocols to provide dynamic bandwidth allocation of said upstream channel. The system grants access to said shared upstream channel to any of said terminals utilizing a plurality of multiplexing modes of operation. A media access control cell with protocol control information is periodically inserted within broadcasts by said ATM network element on said downstream channel of said distribution portion of said network to said terminals, utilizing an ATM slotted transmission format, and dividing the channels into flames and time slots within frames. Each time slot in said upstream channel contains at least one ATM cell; and access to said upstream shared channel is multiplexed. The plurality of modes of operation for sharing media access to said upstream channel includes a first reservation mode of operation providing a deterministic time reservation for time multiplexing access by a terminal for a specific number of time slots in a specific frame. It further includes a second contention mode of operation providing random access to said upstream channel by any terminal during an identifiable frame. Said controller dynamically allocates such frames to each of said modes of operation.

In a second aspect of the invention, a method for providing media access control for a virtual connection in a shared medium network for controlling access to an upstream channel on the distribution portion of said network from terminals to a node to permit transmission of multimedia data, includes the steps of: storing media access control protocols in a controller at said node and at all of said terminals; broadcasting from said controller in a downstream broadcast channel from said node to all of said terminals a media access control cell periodically; including frame information in said media access control cell in said downstream broadcast and assigning time slots within said frames for upstream transmissions from said terminals; and utilizing said media access control cell at said terminals to determine transmission access times. The method further includes the steps of specifying modes of operation for upstream transmissions in time frames for said terminals; establishing a plurality of virtual connections between said node and said terminals; permitting contention frames for unknown virtual connections to said upstream channel; and verifying receipt of transmissions to said node from said virtual connections in said contention frames.

DESCRIPTION OF THE PREFERRED EMBODIMENT

Figure 1:
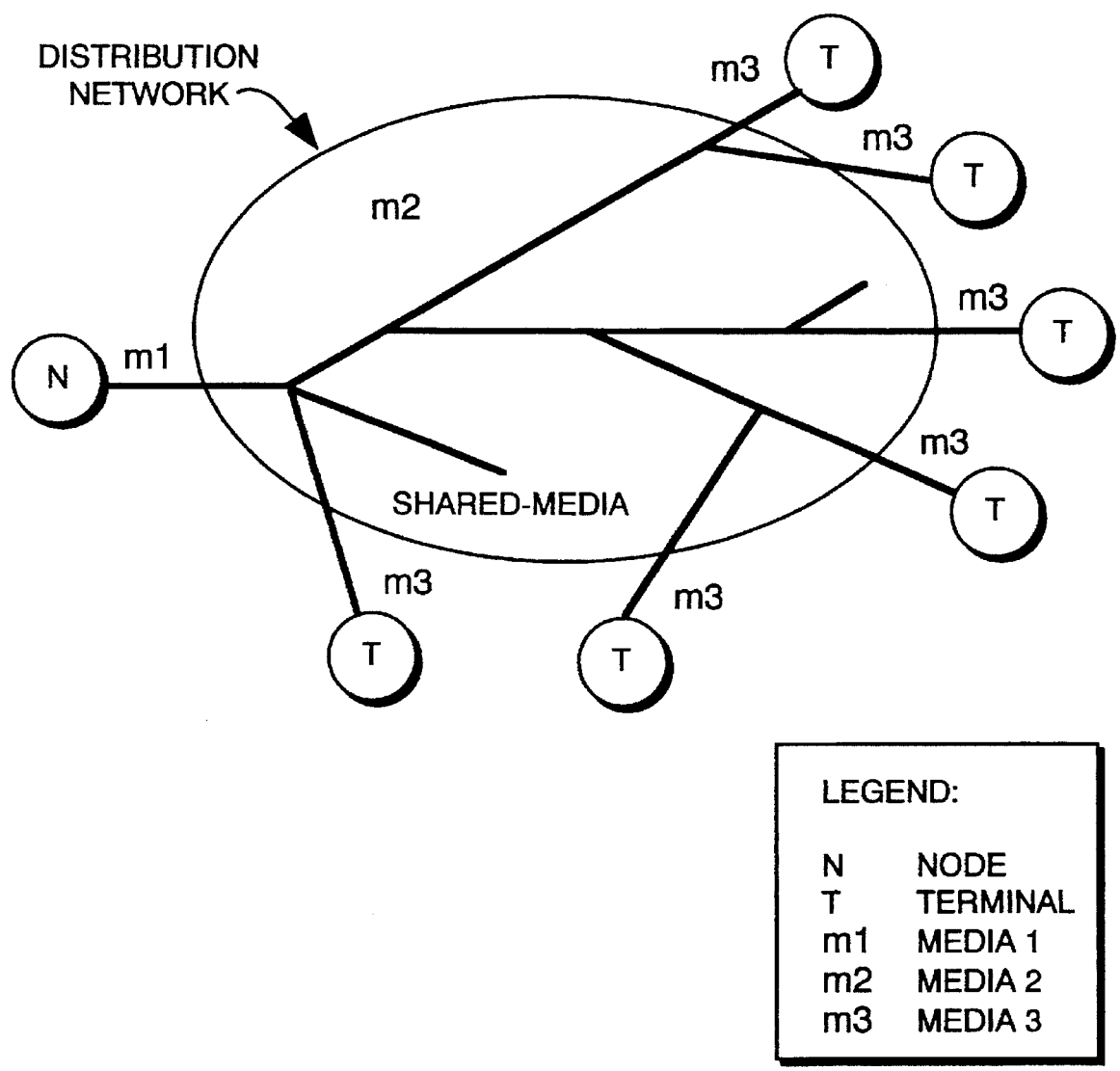
FIG. 1 is a block diagram showing a logical view of the shared media tree-and-branch bus topology.

Referring now to the drawings, FIG. 1 is a block diagram showing a logical view of a shared media tree-and-branch bus topology. A central node N (also referred to in the following description as control node 10, node 10 and controller 10) is connected to a plurality of terminals T by differing types of media, such as optical fiber (m1), coaxial cable (m2) or a twisted wire pair (m3), in a tree-and-branch bus topology. The distribution network has a tree-and-branch bus topology of medium two. The node N connects to the network using medium one, and each terminal T connects to the distribution network using medium three. Signal conversion for transmission in these various media is performed at the appropriate interface. Some or all of the media may be the same.

Figure 2:
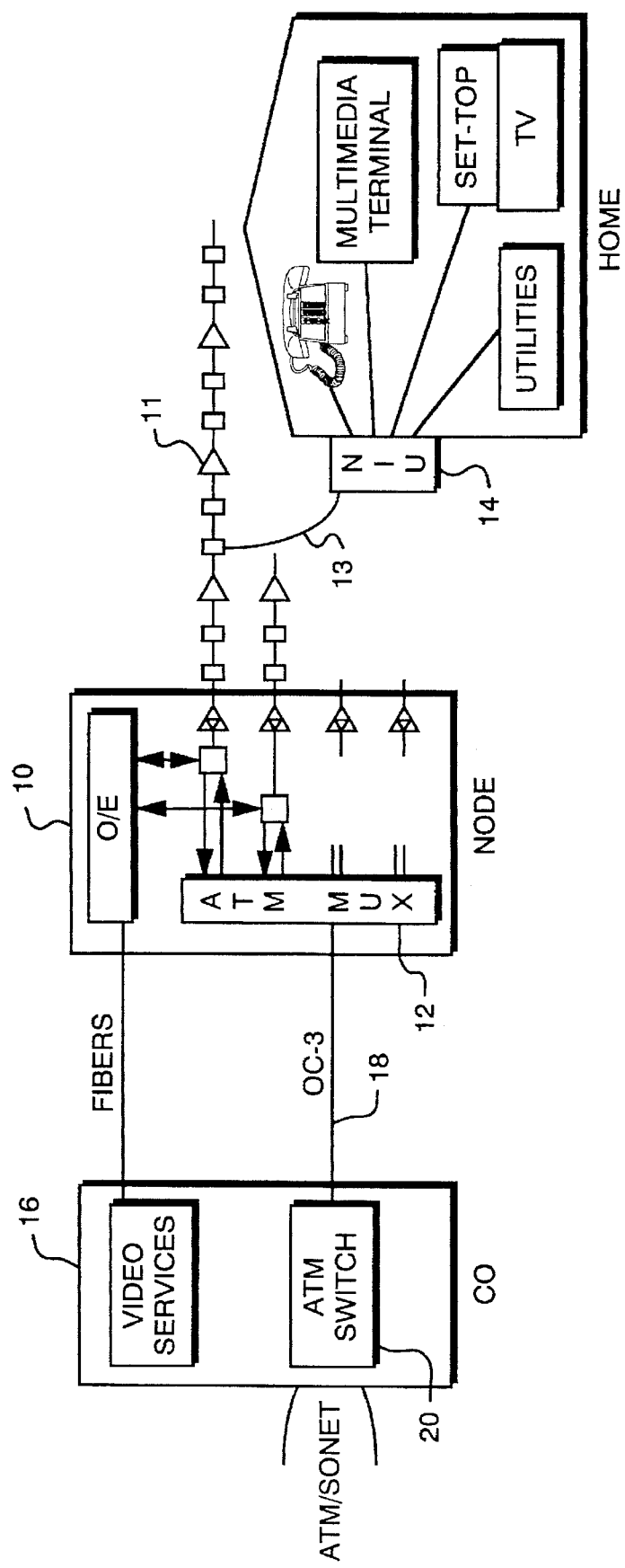
FIG. 2 is a block diagram showing a logical view of an example of a shared-channel access architecture.
Figure 3:
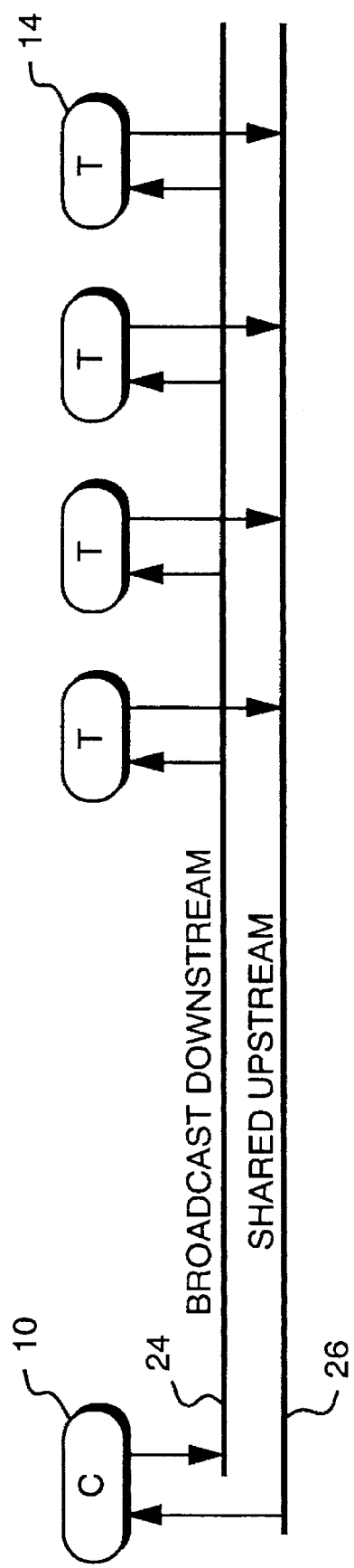
FIG. 3 is a block diagram showing a logical view of the architecture of the virtual connection-media access control for management of the upstream channel in a coaxial distribution access network, according to the present invention.

A typical example of such a shared channel, shared media network is a hybrid fiber-and-coaxial cable network, the architecture of which is illustrated in FIG. 2, though this invention is not limited to such a network. A logical view of the architecture is shown in FIG. 3. The emerging residential broadband architectures have a coaxial distribution access network 11 with a shared medium. At network side of the coaxial distribution network is a node 10, which serves as the controller. Terminals 14 at the user side of the network may be set-top-boxes, multimedia terminals, or home-mounted Network Interface Units (NIU), and will share the same upstream channel 26. The method of the present invention grants upstream channel access to a terminal on the basis of a virtual connection, and a terminal may have many such connections. For this reason the method is called Virtual Connection-Media Access Control, VC-MAC. VC-MAC provides for the control and management of upstream traffic. This access capability will support simultaneous voice, video, data and multimedia connections from terminals on the network.

In the example of FIGS. 2 and 3, the ATM shared channel protocols reside in the ATM multiplexer (Mux) 12 of the control node 10, and in the home-attached Network Interface Units (N1Us) 14. The ATM multiplexer 12 provides the dynamic bandwidth allocation of the upstream channel 26 and aggregates this traffic for transport to the central office 16 over an OC-3 fiber-link 18, for example. An ATM switch 20 may reside in the central office 16, or the ATM traffic could be transported to another office for switching and connection to the backbone network. Community-bound ATM traffic is transported from the central office 16 to the ATM multiplexer 12. This traffic is then broadcast on a downstream channel 24 by the ATM multiplexer 12 to several segments of a serving area, each with a coaxial distribution network 11. The ATM multiplexer 12 inserts a cell with access protocol control information in the downstream ATM cell stream of a coaxial segment.

ATM cells are transported in a portion of the coaxial cable's bandwidth. Some form of digital modulation, such as QPSK, QAM, or VSB, is used; and these cell-transport channels would have, for example, a channel rate on the order of a 20 Mb/s for both the downstream and upstream paths 24, 26. Cells are broadcast from the ATM multiplexer 12 of the control node 10 over the coaxial distribution network 11, and are tapped by way of a drop cable 13 to a home-attached Network Interface Unit. A possible frequency plan may allocate 750 to 800 MHz for the downstream channel and 850 to 900 MHz for the upstream channel. Below 750 MHz could be video and other services.

ATM transmission in the coaxial distribution network has different properties downstream 24, away from the node 10, and upstream 26. The downstream transport may contain cells that are adjacent to each other, forming a continuous cell stream, as compared to an alternate approach of mapping cells into a frame-oriented transport such as T1 (as used in a T1 carrier system). Cell delineation could be accomplished by the standard HEC delineation method. The downstream transport is considered a slotted transmission format that consists of one-cell-wide slots, and this transmission contains unassigned cells, user cells, OAM cells, and any overhead cells for shared-channel access protocols. Upstream, the channel is shared and must meet the constraints imposed by the tree-and-branch bus architecture. A major problem and an inherent limitation of the tree-and-branch bus coaxial network is that an NIU cannot accurately monitor the upstream channel. As compared with the upstream transport, key features of the downstream transmission are that cells are easily delimited and received and that network timing is distributed to each NIU.

In the operation of the VC-MAC protocol, the upstream channel 26 is shared by the use of ATM packet transmission techniques. Terminals 14 transmit fixed length messages onto the upstream channel 26 that are comprised, for instance, of a preamble and one or more ATM cells. If terminals 14 are not controlled, their packet transmissions may collide in the shared channel 26. A collision occurs when the transmissions from two terminals overlap and interfere with each other. One of the roles of the VC-MAC access control is to grant a terminal access to the upstream channel in a manner that eliminates collisions for a subscriber's traffic.

Figure 4:
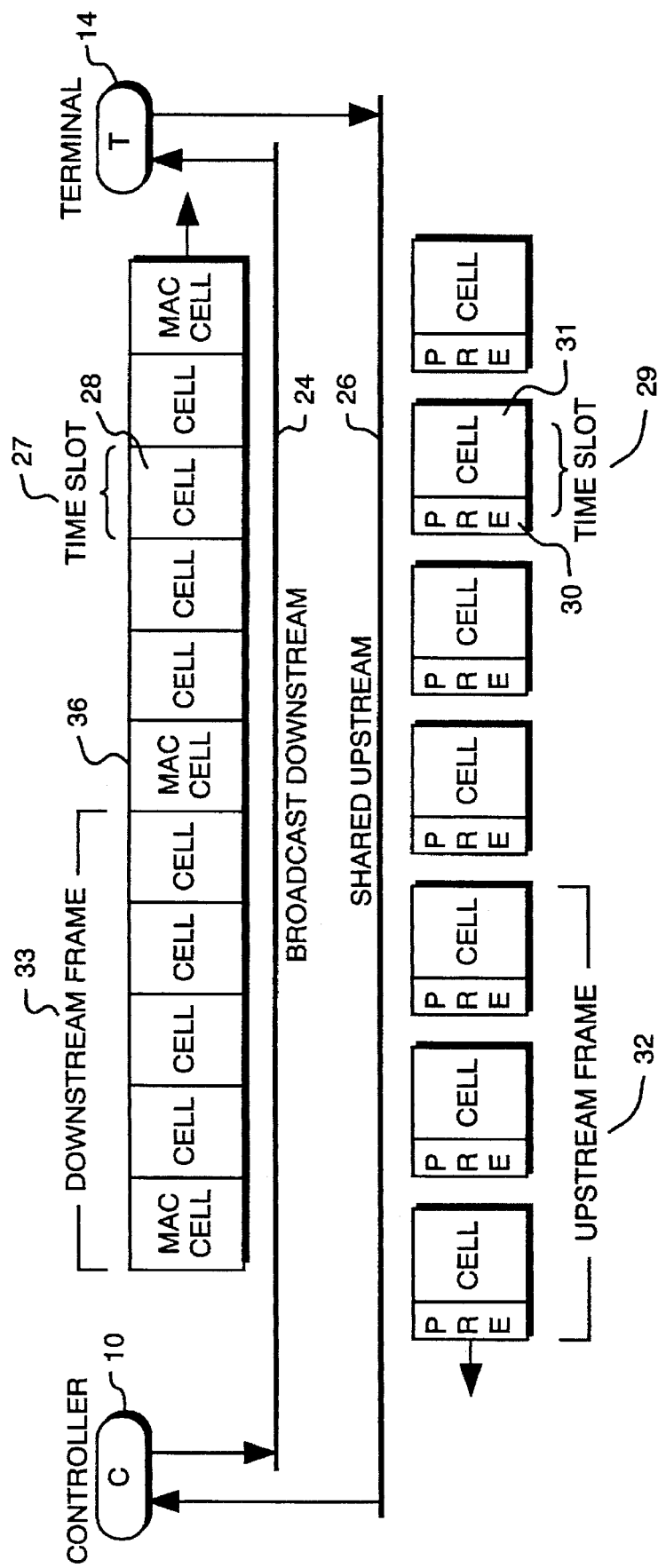
FIG. 4 is a diagrammatic representation of time slots and frames in the upstream and downstream channels in the coaxial distribution access network of FIG. 2, according to the present invention.

Referring now to FIG. 4, both the upstream and downstream channels 24, 26 are divided into time-slots 27, 29. In the downstream direction, the time-slots 27 are one cell in length. The upstream channel 26, in most cases, is also slotted. An upstream time-slot 29 contains a cell 31, or a number of cells with any required additional information such as a preamble 30 needed for synchronization and clock recovery. The upstream time-slot 29 may consist of one or more cells. However, for simplification, this disclosure describes the upstream packet as a preamble 30 and one cell 31. The upstream and downstream time-slots 27, 29 will most likely differ in length due, for example, to the preamble transmission time.

A frame format 32, 33 is used to identify individual time-slots 29, 27 in the upstream channel 26 and the downstream channel 24. The upstream frames 32 are composed of a number of time-slots 29 and may or may not be of a fixed length. However, for illustrative purposes, a fixed length frame is used in this description. To create framing and to provide protocol control information, the controller 10 will transmit a cell, called the MAC cell 36, downstream every k cells. A terminal 14, upon reception of a MAC cell 36, can determine the beginning of a frame on the upstream channel 26, and therefore determine the location of upstream time-slots 29. For example, if a MAC cell 36 is transmitted downstream every T seconds, then the upstream frame period is 1/T.

Figure 5:
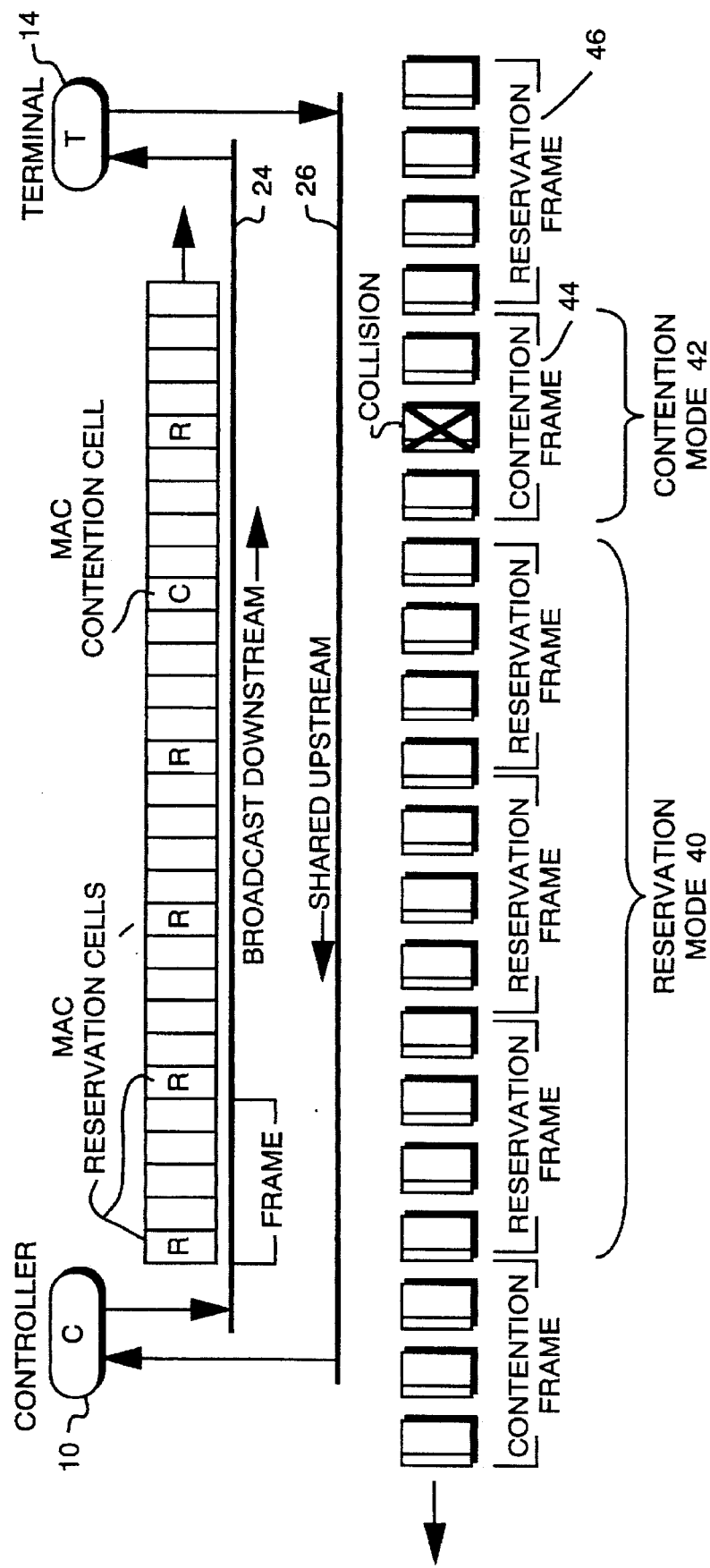
FIG. 5 is a diagrammatic representation of the modes of operation in the upstream and downstream channels in the coaxial distribution access network of FIG. 2, according to the present invention.

Referring now to FIG. 5, VC-MAC has two modes of operation, the Reservation Mode 40, and the Contention Mode 42. As an illustration, one can consider the Contention Mode 42 to occur once every four frames and consist of only one contention frame, as shown in FIG. 5 These modes provide a deterministic time-reservation transfer characteristic, TDMA-like, and a random-access transfer characteristic, ALOHA-like. VC-MAC is considered a hybrid protocol because of the time multiplexing of a deterministic-access, time-reservation-based protocol with a random-access, contention-based protocol. Both modes of operation are needed, as will be explained infra.

The time-reservation access mechanism operates for a period consisting of a number of frames. This mode of upstream channel access is referred to as the Reservation Mode 40. The length of the Reservation Mode is determined by the controller 10. During Reservation Mode frames 46, terminals transmit in time-slots that have been assigned to them by the VC-MAC protocol. A reservation protocol, TDMA-like, operates in the Reservation Mode 40.

Almost all of the traffic on the upstream channel network access needs the time-reservation protocol that operates in the Reservation Mode 40, and this protocol predominates. The key feature of the time-reservation protocol is its deterministic behavior that allows traffic management of access to the upstream channel. However, for a small amount of access traffic, there are no established connections between the controller and the access terminal. This traffic requires a connectionless access mechanism. An example of this connectionless traffic is the traffic created by a terminal power-on while a signaling virtual channel is established. This connectionless traffic acquires upstream bandwidth by way of the contention protocol that operates in the Contention Mode 42. Therefore, VC-MAC protocols create a shared channel connectionless and connection-oriented access.

The controller 10 determines how frequently the Contention Mode 42 and Reservation Mode 40 occur. This is a dynamic process with occasions in which the access is predominately one mode or the other with possible fluctuation in-between. A traffic management algorithm, or some other mechanism, will dynamically determine the frequency of the Contention Mode 42 relative to the Reservation Mode 40 that predominates. As the Contention Mode 42 occurs more frequently, the connectionless access bandwidth increases at the expense of Reservation Mode 40 bandwidth, though this is expected to happen very rarely.

As stated previously, the Reservation Mode 40 is the predominant mode, and it is used to transfer nearly all traffic upstream. It is similar to traditional TDMA in that time-slots are assigned in a frame. There are two important differences. First, VC-MAC time-slots are assigned dynamically for each frame as compared to a fixed slot assignment approach. Slot three of the upstream frame may in one frame contain a cell from terminal 'x' and in the next frame a cell from terminal 'y'. Second, VC-MAC time-slots are assigned to virtual connections within a terminal. As an example of this, slot three of the upstream frame may in one frame contain a cell from virtual connection with a value of 100 and in the next frame a cell from virtual connection with a value of 401 in the same terminal.

A terminal 14 receives information in the MAC cell 36 as to the frame type, that is, either a reservation frame 46 or a contention frame 44. If the frame is a reservation frame 46, then terminals will receive slot assignments, if any, from the MAC cell 36. The MAC cell slot assignment specifies each virtual connection identifier assigned a slot in that frame. VC-MAC assigns time-slots only for established virtual connections. A cell is transmitted into an upstream time-slot from a terminal's buffer that contains cells for that virtual connection.

The dynamic assignment of cells to upstream channel time-slots 29 is performed by a bandwidth allocation mechanism. This mechanism will assign upstream time-slots to virtual connections on a frame by frame basis. The dynamic assignment mechanism will operate to manage the traffic characteristics in the upstream channel allowing the transport of mixed traffic types such as voice, video, data, and multimedia.

The infrequent mode of operation is the Contention Mode 42. During a contention frame 44 any terminal may transmit, a free-for-all (ALOHA-like), and collisions can occur. The controller 10 acknowledges successful transmission by way of information in the MAC cell 36 it periodically sends downstream. The VC-MAC protocol uses a retransmission strategy to retransmit in a contention frame 44 any cell that was not correctly received, mostly due to collisions.

The use of Contention Mode 42 is for infrequent terminal conditions. These uses will generate a very low demand on the upstream bandwidth. For instance, a terminal is connected to the network, its power is turned-on, and it sends an 'I'm alive' message to the network. Because the access network is centrally controlled, the controller does not know of this newly added terminal. There are no virtual connections established between the controller and this terminal. Therefore, the controller cannot assign it upstream time slots. A connectionless access mechanism is needed for the establishment of a signaling virtual channel (using meta-signaling procedures).

As a second example, in the instance of a terminal failure, a terminal may have lost synchronization with the controller and cannot determine the upstream slot timing. A special control function communicates between the controller and terminal so that the terminal can learn the access timing, determine the slot boundries, and calculate timeslot guard bands required to compensate for propagation delays. In this instance, there is not an established virtual connection and some form of connectionless access is needed.

Figure 6:
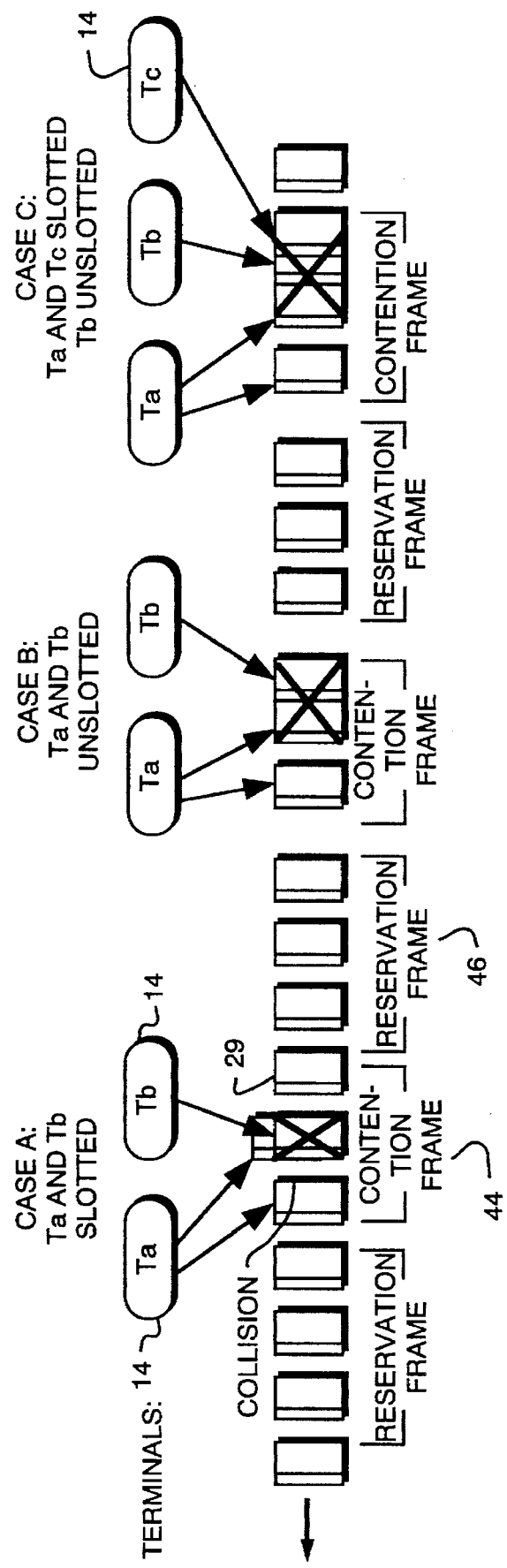
FIG. 6 is a diagrammatic representation of the two transmission methods available in the contention mode of operation in the upstream channel in the coaxial distribution access network of FIG. 2, according to the present invention.

Within the contention frame 44, there are two transmission methods. Upon reception of a MAC cell 36 from the controller 10 signaling a contention frame 44, the terminal 14 will make a decision to transmit using a slotted protocol or an unslotted protocol. A slotted protocol is a protocol that uses network timing information to transmit into time-slots 29. An unslotted protocol is a protocol that does not 'know' of the existence of time-slots 29, and transmits at some time within the frame 44. FIG. 6 is an illustration of these two transmission methods.

If the terminal knows the slot timing, then a terminal will randomly pick one of the time-slots 29 in the frame 44, and begin transmission at the beginning of that slot. If no other terminal picks the same timeslot, then the transmission will be collision-free. This is illustrated in FIG. 6, Case A; Terminal Ta picked timeslot one of a contention frame and successfully transmitted in the channel. However, collisions can occur when two or more terminals pick the same timeslot in which to transmit. This is also illustrated in Case A; Both Terminals Ta and Tb randomly picked timeslot two of this contention frame and a collision occurred. Note that there is no overlap into adjacent time-slots. This is because both terminals used a slotted protocol.

If the terminal does not know the slot timing, then a terminal will randomly pick a transmission time within the contention frame and begin transmission of a cell at that time. In some cases, VC-MAC needs this transmission method because the terminal may not have any knowledge of the state of the network and does not know the timing of the upstream time-slots. As illustrated in FIG. 6, Case B; Terminal Ta picked a transmission time that was just after the beginning of a contention frame and successfully transmitted in the channel. Transmissions from other terminals did not overlap and interfere with this transmission.

However, collisions can occur when a unslotted terminal picks a transmission time that causes its signal to interfere with and overlap other transmissions in the frame. This is illustrated in Case B; both Terminals Ta and Tb randomly picked transmission times in this contention frame and a collision occurred. For this unslotted method, the transmissions do not completely overlap as they do in the slotted method.

Additionally, most terminals may know of the time-slot boundaries and use the slotted protocol. But one terminal may be newly added to the network as is Terminal Tb in Case C of FIG. 6. Terminals Ta and Tc use the slotted approach. Terminal Ta picked time-slots one and two. Terminal Tc picked time-slot three. Terminal Tb does not know of the time-slot locations and randomly picked a transmission time in this contention frame. Terminal Tb's unslotted transmission overlapped slots two and three and caused corruption of three packets from the three terminals.

It should be noted that unslotted transmissions occur in a time window within the frame in a manner that guarantees no overlap with adjacent frames. Also, it is expected that unslotted transmissions occur less frequently than slotted transmissions, and that the predominant Contention Mode transmission method is slotted.

Contention mode cells will experience collisions. The upstream contention frame 44 will be a combination of slotted and unslotted transmissions. Two terminals may randomly pick the same time-slot in a frame and a collision will occur. Also, a terminal's unslotted transmission may collide with two occupied time-slots creating three corrupted transmissions. These collisions will reduce upstream throughput. In general, the Contention Mode 42 used for the transport of connectionless traffic will require a small portion of the shared channel bandwidth. Connectionless throughput decreases due to increased collisions as more terminals send connectionless traffic upstream using this contention protocol.

Collisions in contention frames 44 do not effect reservation frames 46. The VC-MAC's dual mode of operation isolates the connection-oriented and connectionless traffic by way of time multiplexing the two access modes; the Contention Mode 42 and the Reservation Mode 40. This method of access control allows the transportation of video, voice, and data in reservation frames that are undisturbed by contention frame collisions.

Stability in the Contention Mode 42 is addressed by a retransmission strategy that uses an increasing delay before trying to retransmit (such as Ethernet's exponential back-off strategy). Acknowledgments of a successful transmission are sent from the controller 10 in the MAC cell 36. If the transmission is unacknowledged, the cell will be retransmitted after a random delay. Additionally, after a number of retries the terminal will give up, no longer attempting transmission of that cell during a contention frame.

In addition, a new functionality, i.e., a connectionless bandwidth control mechanism, may exist in the controller 10 that increases the frequency of contention frames as a function of the number of collisions occurring on the access network. A higher occurrence of contention frames will create more bandwidth for connectionless access traffic and therefore will lower the number of collisions increasing throughput. Such a function could be a component of a traffic management mechanism or bandwidth allocation mechanism that is separate from, but related to VC-MAC.

The method for transmission in a shared-channel 26 is described by the behavior of a terminal 14 as it responds to signals from the controller 10. Flow diagrams are used for this purpose, FIGS. 7 through 13. The controller 10 sends VC-MAC protocol control information downstream using a number of bytes in the downstream signal referred to as the MAC cell 36. This cell is transmitted periodically by the controller 10 creating upstream framing.

Figure 7B:
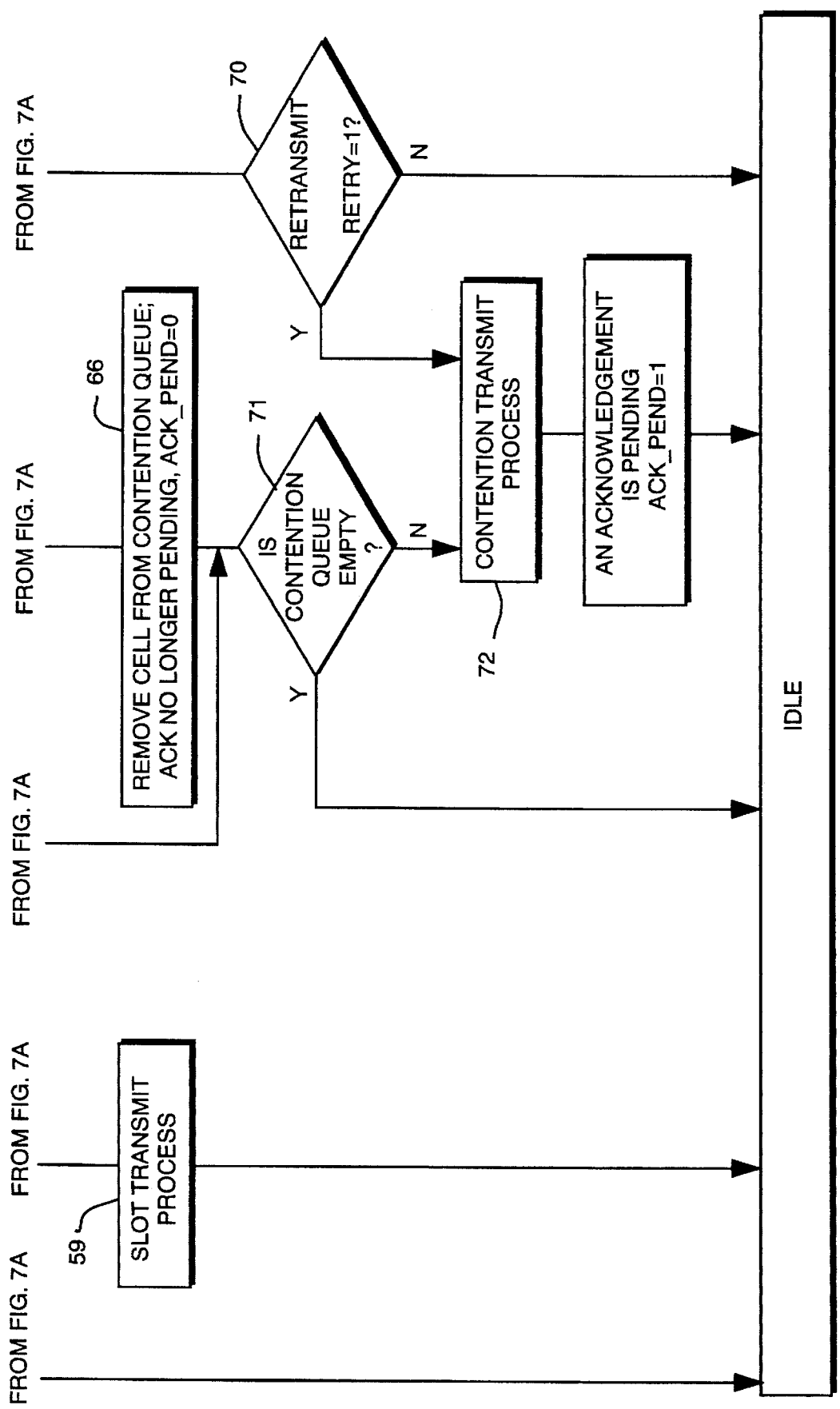
FIG. 7 is a flow diagram representation of the overall terminal behavior in response to VC-MAC protocol control information, according to the preferred embodiment of this invention.

The overall terminal behavior is shown in the flow diagram of FIG. 7. The arrival of a MAC cell 36 indicates the beginning of an upstream frame, 50. The MAC cell indicates the frame type to be either a reservation or contention frame, 52, and contains additional protocol information. If the frame is a reservation frame 46, then the MAC cell contains the slot assignments for that frame in the form of a list referred to as the Permit List. If the frame is a contention frame 44, then the MAC cell contains acknowledgments of successfully received cells in the form of a list referred to as the Ack List.

For a reservation frame 46, a terminal searches the Permit List for slot assignments, 54. If slots are assigned 56, the terminal schedules transmission of assigned cells at the appropriate time in the upstream frame 58, 59.

For a contention frame 44, a terminal 14 will initially transmit a copy of a cell from its contention queue if it is not empty. The terminal 14 will now have an acknowledgment of that cell pending with the the ACK_PEND flag equal to one, 60. Subsequent MAC contention cells may contain the acknowledgment of the successful reception of this cell by the controller. At the beginning of subsequent contention flames the Ack List is searched for the acknowledgment, 62.

If the acknowledgment is received 64, then the cell is removed from the contention queue 66.

However, if an acknowledgment has not been received 64, then a retransmission process is started 68. On the basis of the retransmission algorithm 70, another copy of the cell that is still in the contention queue may be transmitted 72.

In the following paragraphs, additional detail is provided on the terminal behavior during a reservation frame. First the Permit List and VC Table are described followed by a description of the Search Permit List Algorithm, the Reservation List, the Slot Scheduler Process, and the Slot Transmit Process.

The Permit List specifies a list of ordered pairs of the form [S(i),VC(i)] that indicates slot S(i) is assigned to virtual circuit, VC(i) for the current frame. Since the list is ordered, the order in which the VC(i) values occur in the list determines the slot assignment, S(i), for the virtual circuit. Each terminal receives the same ordered list of virtual circuits and with implicit slot assignments and it can determine when it should begin its own transmissions. The slot assignment is to a virtual circuit and not a specific terminal on the access media.

Present in the terminal 14 is a table of virtual circuit addresses for established connections with the controller 10. This connection address list is referred to here a the VC Table. The VC Table specifies a list of ordered pairs of the form [VC(k), VPI/VCI] that indicates the VPI/VCI addresses for each of the established connections. A permit is an address of value VC(k) and may be the equal to or different from the associated VPI/VCI.

At the beginning of a Reservation Frame, the Permit List provided by the MAC cell is searched to determine the terminal's slot assignments to established virtual circuits. The VC Table that lists the established virtual circuits is searched and is compared to the Permit list. A Reservation List is created that contains the slot number, SN, associated to an establish virtual circuit's VPI/VCI. The Reservation List specifies an indexed list of the form [j, SN, VPI/VCI] that indicates the slot number assigned to virtual circuit labeled by a VPI/VCI address value.

Figure 8:
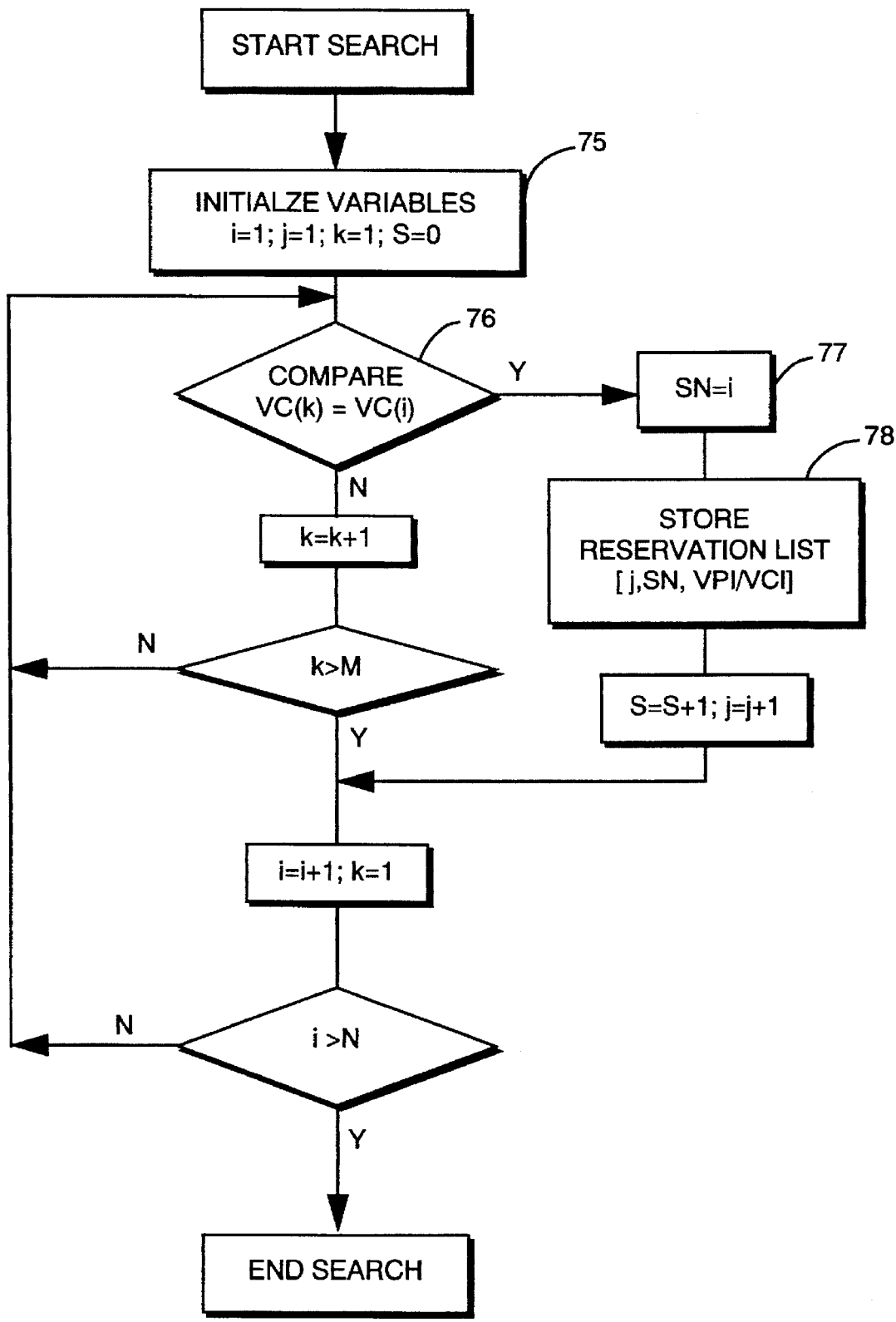
FIG. 8 is a flow diagram representation of the Search Permit List Algorithm, according to the preferred embodiment of this invention.

A flow diagram is used to describe the Search Permit List Algorithm, FIG. 8. First, the variables are initialized, box 75. Indices i and k are used to index the search algorithm's variables. The variable S is the number of time slots assigned to the terminal for the current reservation frame. The variable N is total the number of time slots in the current reservation frame. The variable SN is the time slot number in the frame, with a range in value from 1 to N. The variable M is the total number of established virtual circuits. The VC Table is searched by comparing VC(k) in the table to each permit, VC(i). If there is a match, then the index i represents the slot number, SN, and VC(k) represents the established virtual circuit's VPI/VCI by way of the mapping in the VC Table.

The search begins with the first permit. A comparison is made to the VC table by indexing though VC(k) from 1 to M, where M is the total number of established virtual circuits, 76. If a match is found, then that permit assigns VC(k) to slot one, i=1, 77. VC(k) is mapped in the VC Table to an established virtual circuit's VPI/VCI. The Reservation List would have an entry for slot one and the VPI/VCI associated to VC(k), 78. For each permit, VC(i), the VC Table is searched until all slots for the current frame are assigned, if any.

After the Permit List has been searched, there is a Reservation List that consists of S elements, where S is the number of assigned slots for the current reservation frame. The List is ordered in increasing slot number. The Scheduler creates timers that are assigned values based on the slot number. A timer, T(j), is associated with the Reservation List by way of the timer index j in that Timer One, T(1), is associated with the first element of the list, Timer Two, T(2), is associated with the second element of the list, and so on. The first element is the first assigned slot for the terminal. The transmit slots are of equal duration and the slot duration is the constant, Ts. Each terminal has a different delay to the controller due to signal propagation delay. A constant offset, Tr, is added to the scheduled transmission time so that the transmissions from other terminals do not interfere. Part of offset, Tr, may be present to compensate for algorithm processing delay.

Figure 9:
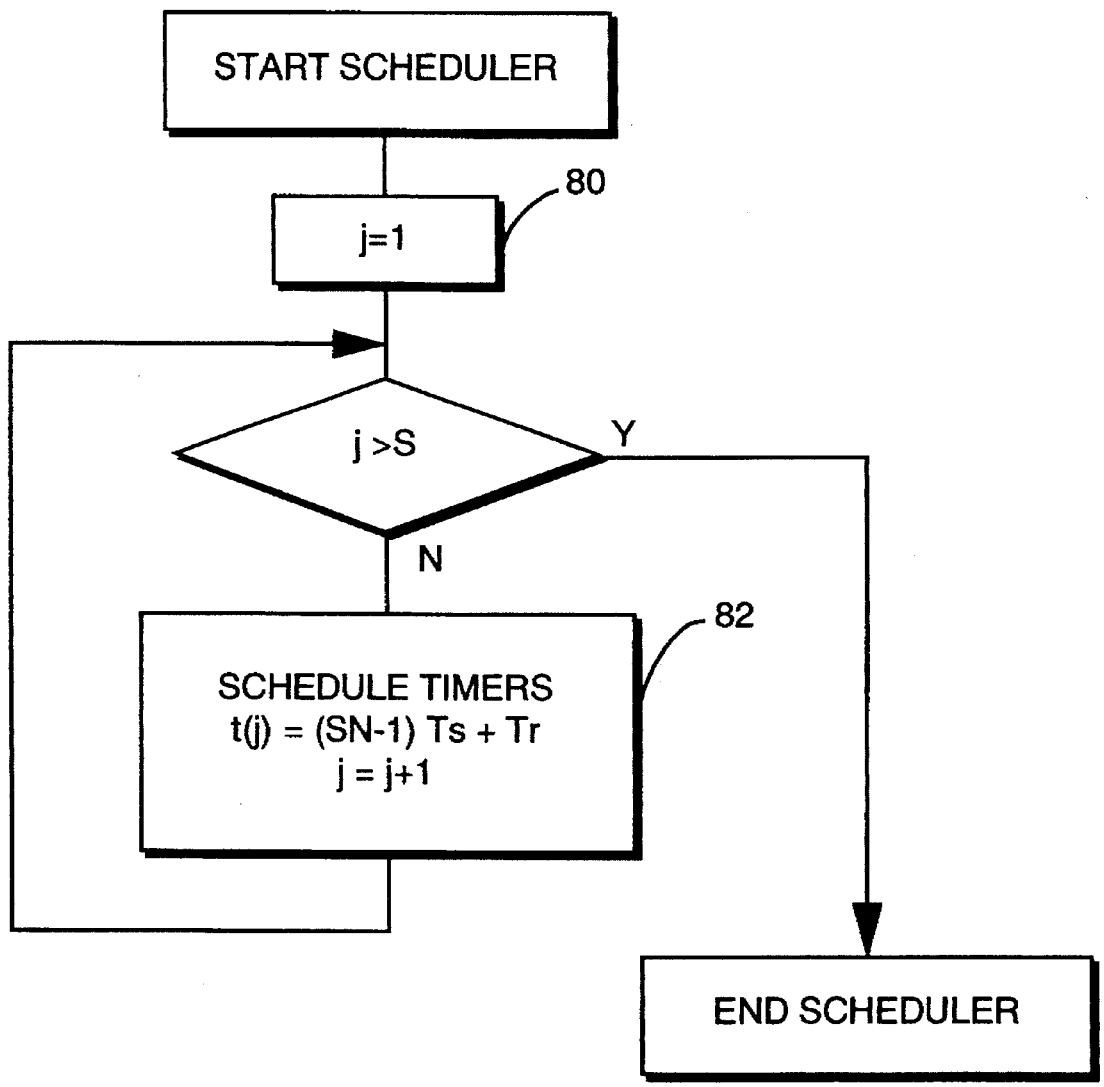
FIG. 9 is a flow diagram representation of the Slot Scheduler Process, according to the preferred embodiment of this invention.

A flow diagram is used to describe the Slot Scheduler Process, FIG. 9. Index j is used to assign up to S timers where S is the number of time slots assigned to the terminal for the current reservation frame, 80. The first timer, T(1), is assigned a time value that is a multiple of the slot transmission time plus an offset, Tr, 82. When the timer value equals zero, the transmission of slot SN can begin with a cell associated with SN as indicated in the Reservation List. There are S timers configured by the Scheduler and used in the Slot Transmit Process.

The transmit process waits for the beginning of an assigned time slot in a reservation frame and transmits a cell from the assigned VPI/VCI queue. For each established connection addressed by a VPI/VCI there is an associated queue that holds traffic pending access to the shared channel. Slot times were scheduled by the Scheduler and timers assigned appropriate values. The timers are indexed by increasing slot number and the timer index, j, is the associated index in the Reservation List and maps timer T(j) to the assigned VPI/VCI(j) for that time slot.

Figure 10:
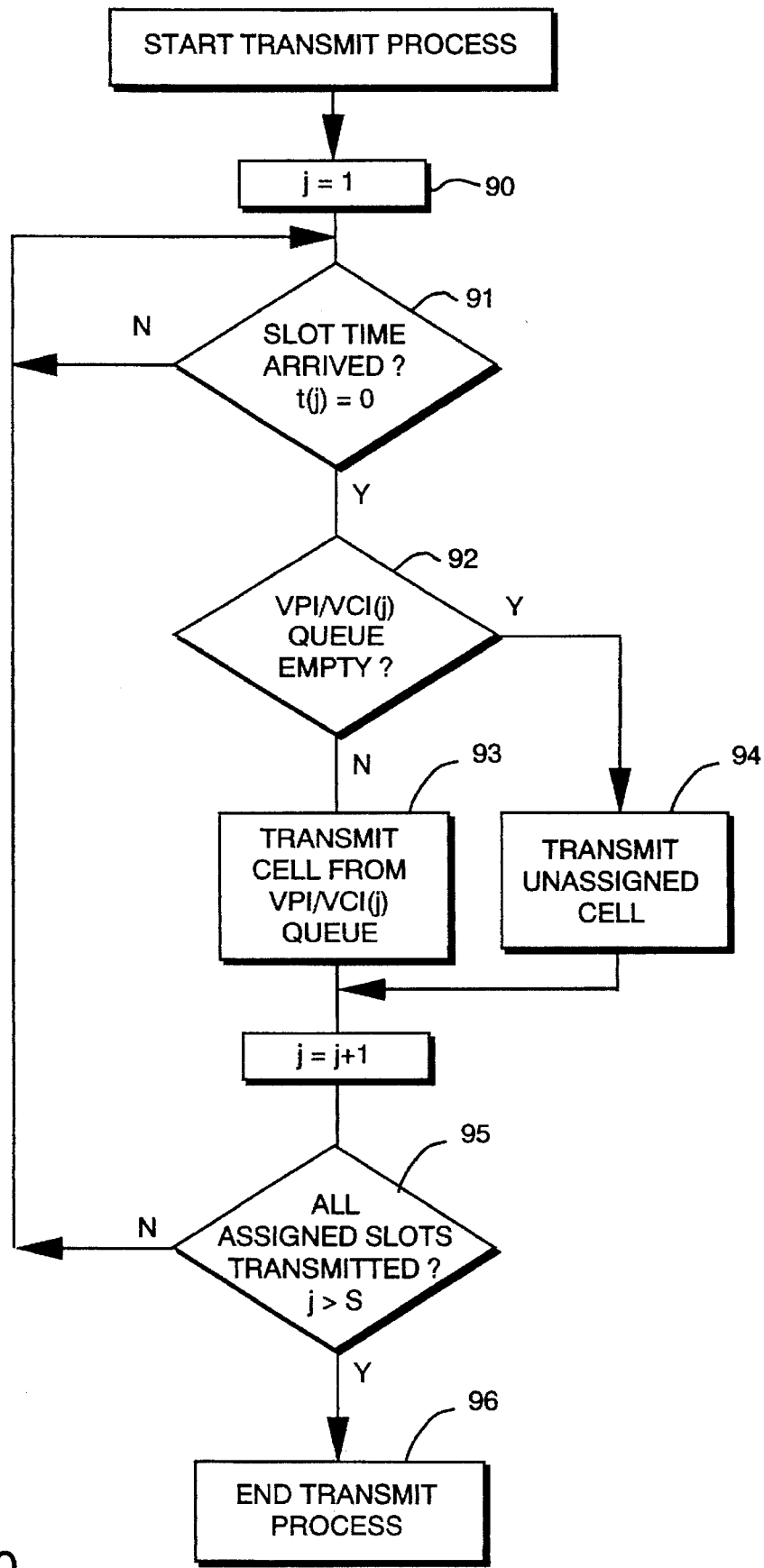
FIG. 10 is a flow diagram representation of the Slot Transmit Process, according to the preferred embodiment of this invention.

A flow diagram is used to describe the Slot Transmit Process, FIG. 10. Index j is used to index up to S timers where S is the number of time slots assigned to the terminal for the current reservation frame, 90. Because the timers are indexed in increasing slot number, Timer One, T(1), equals zero before Timer Two, T(2), equals zero and so on. The transmit process waits for the first assigned time slot to arrive, 91. This occurs for T(1) equal to zero and maps to j=1 in the Reservation List that indicates the VPI/VCI for that time slot. When T(1) equals zero, it is the beginning of the assigned time slot and a cell is transmitted from the appropriate VPI/VCI queue, 93. The transmit process does not wait until the slot transmission is complete and it continues to observe the next timer. For some traffic management schemes, a VPI/VCI queue may be empty and if this is the case an unassigned cell is transmitted, 94. After all assigned slots (the value of S) are transmitted, 95, the process terminates, 96. The terminal returns to the IDLE state waiting for the reception of a MAC cell indicating the start of a frame and if the frame is to be a reservation or contention frame.

In the following paragraphs, additional detail is provided on the terminal behavior during a contention frame. First the Ack List is described followed by a description of the Search Ack List Process, the Contention Transmit Process, and the Retransmission Process.

The acknowledgment list, here referred to as the Ack List, specifies a list of acknowledgments of the form [RI(i)] where an element of the list is the acknowledgment of a cell with a Random Identifier, RI. A Random Identifier is used to identify a cell from a terminal's Contention Queue. The number, RI, is randomly generated and may be a field in the preamble of the upstream packet. Alternatively, the RI may use part of or all of the VPI/VCI field in cells from this queue. Each terminal receives the same list of acknowledgments and can determine if and when it should retransmit. The use of the contention process is for connectionless traffic, traffic for which there is no virtual connection.

Error procedures determine procedural problems and resolve them in a defined manner. For example, there is a possibility that two or more terminals may choose the same RI values. The protocol includes methods for detecting this condition as well as methods for recovering from it.

A cell from a terminal's Contention Queue is identified by a random number, RI, the Random Identifier. This number is used to uniquely identify the cell and to determine if the cell has been correctly received by the controller. A flow diagram is used to describe the Search Ack List Process, FIG. 11. The Ack List is searched and each RI in the list is compared to the RI for the last contention cell transmitted, which is still in the Contention Queue, 100. The list is consists of N elements. If there is a match, then the cell was received by the controller and the acknowledgment is indicated by ACK_RECEIVED equals one, 102. The cell is removed from the Contention Queue.

Referring now to FIG. 7, the next step in the current contention frame is checking the state of the Contention Queue, 71. If a cell is queued, then it is transmitted, 72. If the queue is empty then no cell is transmitted and the terminal returns the IDLE state awaiting the next MAC cell.

The Contention Transmit Process transmits cells from a terminal's Contention Queue during a Contention Frame. A flow diagram is used to describe the contention Transmit Process, FIG. 12. The frame may appear slotted or unslotted. It appears unslotted if a terminal is unable to determine slot boundaries. For this case the slot timing is unknown. It appears slotted if the terminal has used a mechanism to determine the slot boundaries and synchronize to the upstream time slots.

If the slot timing is known, 110, a slot in the frame is picked from one of N slots where N is the number of slots in the Contention Frame, 112. A function, $f_1$, is used to pick the slot number and could be, for example, a uniform selection with equal likelihood of picking any of the N slots. After the slot number, SN, is selected, a timer is scheduled for the beginning of the slot transmission time, 114. When the timer expires, t=0, 116, a cell is transmitted from the Contention Queue into the selected time slot, SN, 118. An indication is set for a pending acknowledgment, ACK_PENDING equals one, 120.

However, if the slot timing is unknown, 111, then the contention frame is unslotted and becomes a time-window of opportunity in which to transmit a cell. A function, $fd_2$, is used to pick a point within this time-window. For example, the contention frame could be divided into fixed units of Tu seconds. The contention Frame is of length Tf seconds and would contain M of these time units (M=Tf/Tu). The function could then pick a number from one to M. The transmit time would then be M times Tu (MTu), 113. A timer is scheduled for the beginning of the slot transmission time using MTu in addition any timing offsets required, constant C, 115. When the timer expires, t=0, 116, a cell is transmitted from the Contention Queue, 118. An indication is set for a pending acknowledgment, ACK_PENDING equals one, 120.

Figure 11:
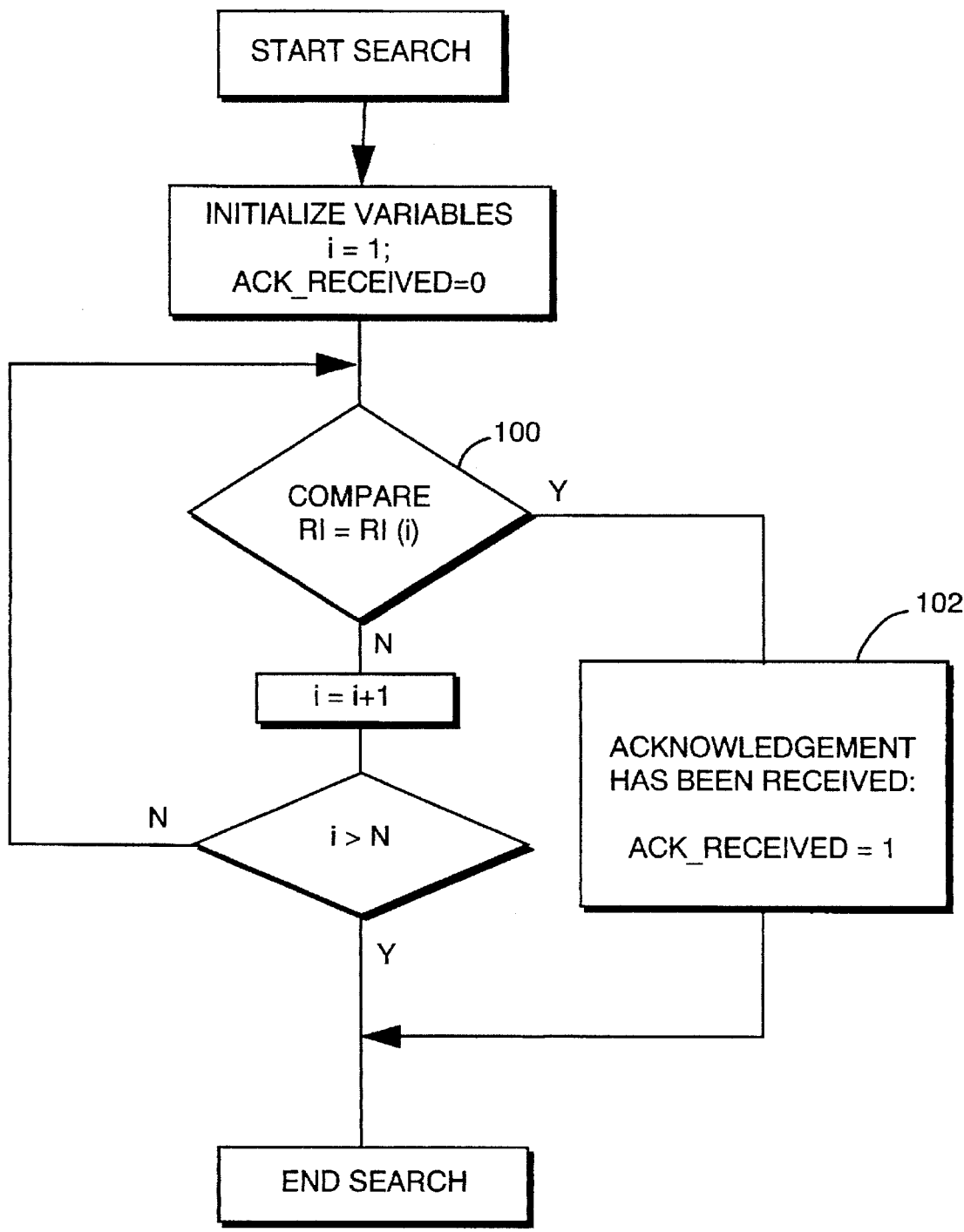
FIG. 11 is a flow diagram representation of the Search Ack List Process, according to the preferred embodiment of this invention.
Figure 12:
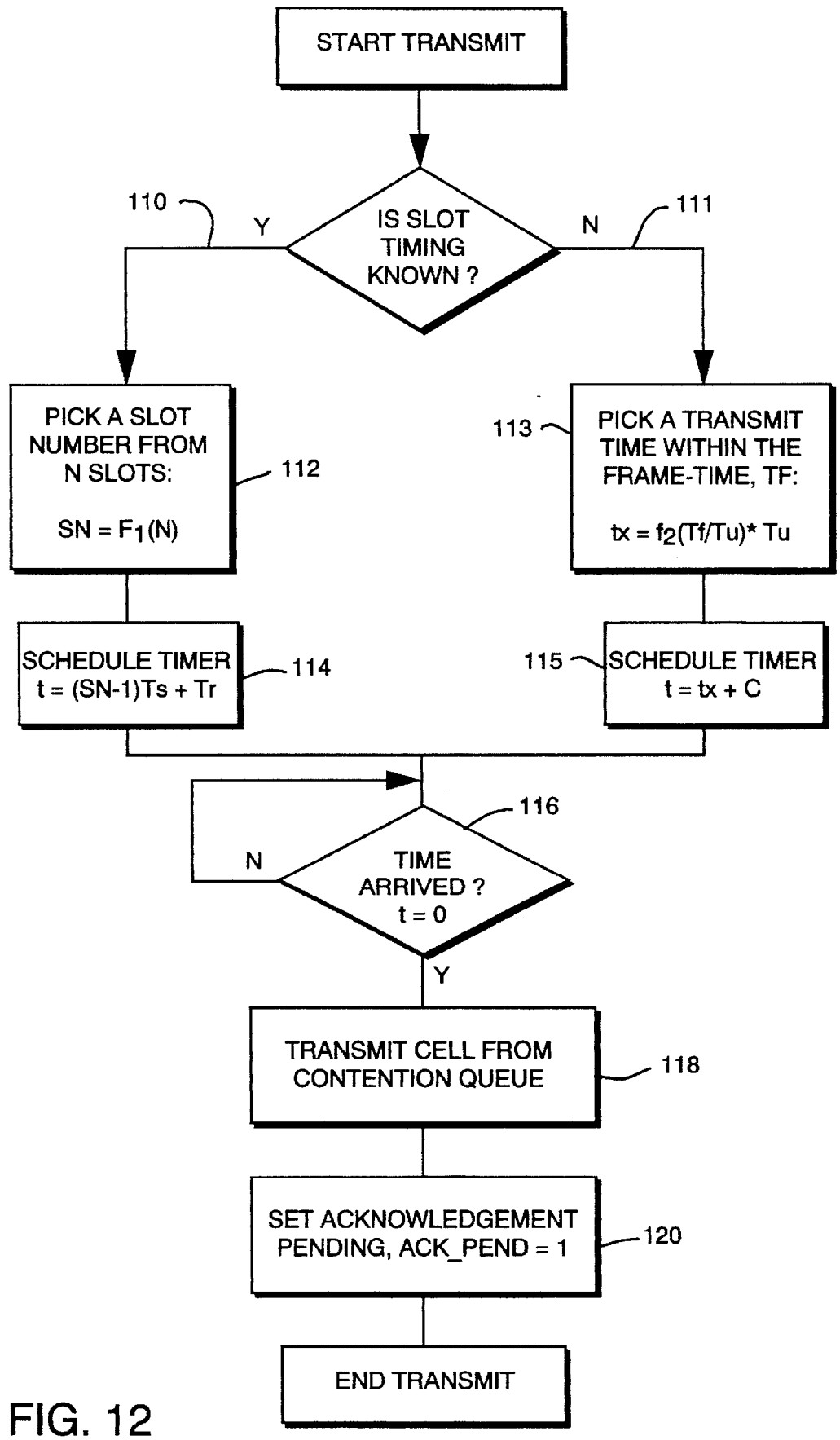
FIG. 12 is a flow diagram representation of the Contention Transmit Process, according to the preferred embodiment of this invention.
Figure 13:
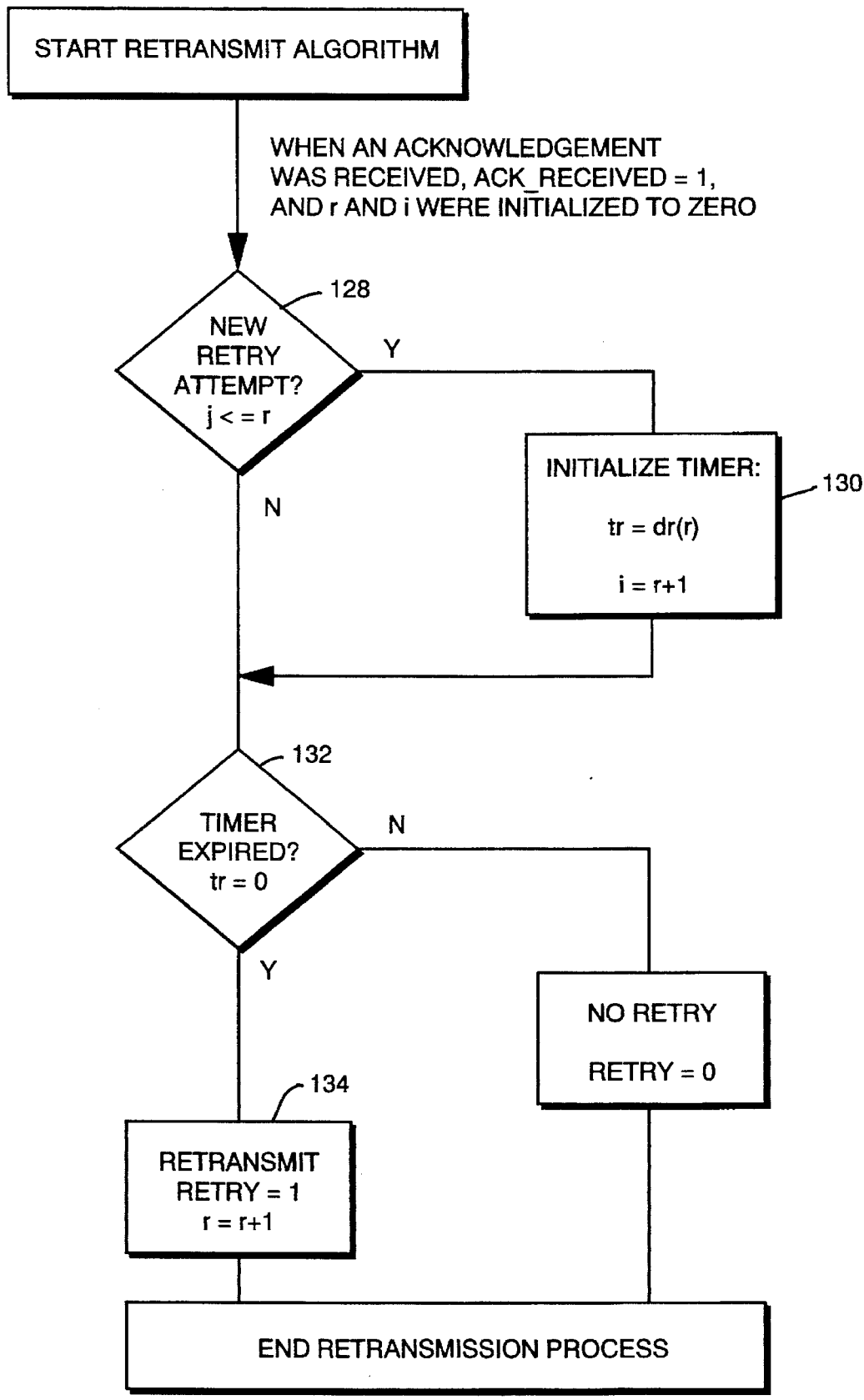
FIG. 13 is a flow diagram representation of the Retransmission Process, according to the preferred embodiment of this invention.

After a contention cell is transmitted, the terminal will retransmit the cell if no acknowledgment is received as determined by the Search Ack List Process, see FIG. 11. Various retry strategies could be employed. In general, after some delay from the first transmission, another attempt to transmit the cell is made. This process is repeated until either an acknowledgment is received or the terminal gives up. In this protocol only one contention cell is transmitted from a terminal during a Contention Frame. The terminal waits for an acknowledgment for that cell before another cell can be transmitted. A flow diagram is used to describe the Retransmission Process, FIG. 13.

At the beginning of the Contention Frame that follows the contention cell transmission, it is determined if an acknowledgment is received. If no acknowledgment has been received, then a time for retransmission is scheduled. During this time if an acknowledgment is received the acknowledgment pending cycle for that cell terminates. The variable i is an index for the algorithm, and r is the number of retry attempts. During the first frame with an acknowledgment pending, 128, a timer, tr, is set with a time interval, 130. While waiting for this time to elapse, acknowledgments are searched. If the timer expires, 132, then a retransmission of the cell is made, 134. The timer delay is determined by some function, dr(r). This delay, dr(r) is a function of the number of retry attempts, r. The delay interval could be determined, for example, by uniformly selecting from X time units where the range of X is a geometrically increasing function of the number of retires, r.

VC-MAC, the hybrid shared channel access protocol, has uses in other communications networks. VC-MAC, in general, has application in networks that have a centralized control architecture with a broadcast channel from the controller to all terminals and a shared channel from all terminals to the controller.

VC-MAC can be used in Satellite Networks for ATM wide area communications. In one of the possible satellite architectures, an earth-base-station serves as the controller and all other ground-stations as user terminals. The satellite serves the role of a transponder. The control-station transmits on an uplink to the satellite and this information is broadcast by the satellite to all terminals analogous to the fiber/coax downstream channel. All terminals share the same uplink channel that is received by the satellite then broadcast to the controller. A second satellite network architecture for VC-MAC implements the controller function in the satellite. In this case there is one shared uplink from all user terminals and one broadcast downlink.

VC-MAC has application in passive optical networks, PONs, with a tree-andbranch bus topology. This architecture is logically equivalent to the coaxial access portion of the fiber/coax architecture. At the root of the fiber tree-and-branch bus is a network element that serves as the controller and at the leaves of the tree are terminals (Network Interface Units, or workstation-like-cpe). The downstream and upstream channels may be on separate fibers or separate wavelengths on the same fiber. VC-MAC allows the upstream channel to be shared for ATM transmission.

VC-MAC has application in packet radio networks and wireless LANs. A base station serves as the controller and user terminals are the access devices. All terminals transmit to the base station on the same shared channel using the VC-MAC protocol. The controller broadcasts to all terminals on the same outbound channel. This architecture is logically equivalent to the coaxial access portion of the fiber/coax architecture.

The principal advantages of the method and system of the present invention are the following new features of VC-MAC for shared channel, shared media networks. The method of the present invention enables ATM transmission in a shared channel. VC-MAC enables cell transmission for interactive services over a shared channel coaxial network. Any cell format may be used, however, ATM is most suitable. This method also supports multimedia traffic. VC-MAC shares the channel bandwidth among virtual connections and not terminal interfaces as in most shared access techniques. This allows management of the quality of service and service attributes for interactive multimedia applications. It also integrates a connectionless access mechanism. VC-MAC provides a connectionless access mechanism needed to fulfill requirements such as the establishment of a signaling virtual channel, or the transmission of user initiated signals like a terminal power-on indication. Thus, it provides greater bandwidth utilization. VC-MAC provides greater bandwidth utilization by using statistical multiplexing, a high degree of bandwidth granularity, and by using dynamic bandwidth allocation mechanisms.

I claim:

1. A system for controlling access to a shared channel for cell transmission in a shared medium network, wherein the shared medium distribution portion of said network extends from a node to a plurality of terminals within a community, having a tree-and-branch bus topology, comprising:

a downstream broadcast channel from said node to all terminals on said distribution network;

a shared upstream channel, separate from said downstream broadcast channel, from all of said terminals to said node;

a network controller at said node for central control of access of media transmissions from said terminals over said upstream channel;

media access control protocols residing in said controller and in said terminals;

an asynchronous transmission mode (ATM) network element at said node having ATM shared channel protocols to provide dynamic bandwidth allocation of said upstream channel; and means to grant access to said shared upstream channel to any of said terminals utilizing a plurality of multiplexing modes of operation.

2. A system for controlling access to a shared channel for cell transmission in a shared medium network, wherein the shared medium distribution portion of said network extends from a node to a plurality of terminals within a community, having a tree-and-branch bus topology, comprising:

a downstream broadcast channel from said node to all terminals on said distribution network;

a shared upstream channel from all of said terminals to said node;

a network controller at said node for central control of access of media transmissions from said terminals over said upstream channel;

media access control protocols residing in said controller and in said terminals;

an asynchronous transmission mode (ATM) network element at said node having ATM shared channel protocols to provide dynamic bandwidth allocation of said Upstream channel; and means to grant access to said shared upstream channel to any of said terminals utilizing a plurality of multiplexing modes of operation;

wherein said means to grant access to said shared upstream channel to any of said terminals utilizing a plurality of multiplexing modes of operation, comprises:

a media access control cell with protocol control information periodically inserted within broadcasts by said ATM network element on said downstream channel of said distribution portion of said network to said terminals;

said broadcasts on said downstream channel utilizing an ATM slotted transmission format;

said media access control protocols dividing said downstream and upstream channels into frames and time slots within frames;

means to identify time slots using a frame format;

each time slot in said upstream channel able to contain at least one ATM cell; and means to multiplex access to said upstream shared channel using ATM packet transmission techniques.

3. The system of claim 2, wherein said means to multiplex access to said upstream shared channel using ATM packet transmission techniques further comprises:

a plurality of modes of operation for sharing media access to said upstream channel;

a first reservation mode of operation providing a deterministic time reservation for time multiplexing access by a terminal for a specific number of time slots in a specific frame; and means in said controller to dynamically allocate frames to each of said modes of operation.

4. The system of claim 3, wherein said means to multiplex access to said upstream shared channel using ATM packet transmission techniques further comprises:

means to broadcast a media access control cell downstream so that each terminal can determine when a frame begins;

means to dynamically assign slots in a frame to various terminals;

means for one of said terminals to transmit in a slotted protocol if that terminal has received timing information; and bandwidth allocation means to assign dynamically cells from virtual connections to upstream channel slots on a frame by frame basis.

5. The system of claim 3, wherein said means to multiplex access to said upstream shared channel using ATM packet transmission techniques further comprises:

means for a terminal to transmit in an unslotted protocol if said terminal has not received timing information;

means for a terminal to establish a virtual connection to said network in said contention mode;

means to operate in a contention mode when said media access control cell designates a frame for contention mode transmissions;

means to acknowledge successful transmissions in subsequent media access control cells; and means to retransmit cells for which no acknowledgment is received.

6. The system of claim 3, wherein said means to multiplex access to said upstream shared channel using ATM packet transmission techniques further comprises:

means to dynamically allocate the modes of operation as a function of collisions in said upstream channel.

7. A system for controlling access to a shared channel for cell transmission in a hybrid fiber optic/coaxial cable network, wherein the coaxial cable distribution portion of said network extends from a fiber node to a plurality of terminals within a community, having a tree and branch topology, comprising:

a downstream broadcast channel from said fiber node to all terminals on said distribution network, a shared upstream channel, separate from said downstream broadcast channel, from all of said terminals to said fiber node;

a network controller for central control of access of media transmissions from said terminals over said upstream channel;

media access control protocols residing in said controller and in said terminals;

an asynchronous transmission mode (ATM) multiplexer with said controller having ATM shared channel protocols to provide dynamic bandwidth allocation of said upstream channel; and means to grant access to said shared upstream channel to any of said terminals.

8. A system for controlling access to a shared channel for cell transmission in a hybrid fiber optic/coaxial cable network, wherein the coaxial cable distribution portion of said network extends from a fiber node to a plurality of terminals within a community, having a tree and branch topology, comprising:

a downstream broadcast channel from said fiber node to all terminals on said distribution network, a shared upstream channel from all of said terminals to said fiber node;

a network controller for central control of access of media transmissions from said terminals over said upstream channel;

media access control protocols residing in said controller and in said terminals;

an asynchronous transmission mode (ATM) multiplexer with said controller having ATM shared Channel protocols to provide dynamic bandwidth allocation of said upstream channel; and means to grant access to said shared upstream channel to any of said terminals;

wherein said means to grant access to said shared upstream channel to any of said terminals, comprises:

a media access control cell with protocols periodically inserted within broadcasts by said ATM multiplexer on said downstream channel of said coaxial cable distribution portion of said network to said terminals;

said broadcasts on said downstream channel utilizing an ATM slotted transmission format;

said media access control protocols dividing said downstream and upstream channels into frames and time slots within frames;

means to identify time slots using a frame format;

each time slot in said upstream channel able to contain at least one ATM cell; and means to multiplex access to said upstream shared channel using ATM packet transmission techniques.

9. The system of claim 8, wherein said means to multiplex access to said upstream shared channel using ATM packet transmission techniques further comprises:

a plurality of modes of operation for sharing media access to said upstream channel;

a first reservation mode of operation providing a deterministic time reservation for time multiplexing access by a terminal for a specific number of time slots in a specific frame; and a second contention mode of operation providing random access to said upstream channel by any terminal during an identifiable frame; and means in said controller to dynamically allocate frames to each of said modes of operation.

10. The system of claim 9, wherein said means to multiplex access to said upstream shared channel using ATM packet transmission techniques further comprises:

means to broadcast a media access control cell downstream so that each terminal can determine when a frame begins;

means to dynamically assign slots in a frame to various terminals;

means for one of said terminals to transmit in a slotted protocol if that terminal has received timing information; and bandwidth allocation means to assign dynamically cells from virtual connections to upstream channel slots on a frame by frame basis.

11. The system of claim 9, wherein said means to multiplex access to said upstream shared channel using ATM packet transmission techniques further comprises:

means for a terminal to transmit in an unslotted protocol if said terminal does not know the slot timing;

means for a terminal to establish a virtual connection to said network during said contention mode;

means to operate in a contention mode when said media access control cell designates a frame for contention mode transmissions;

means to acknowledge successful transmissions in subsequent media access control cells; and means to retransmit cells for which no acknowledgment is received.

12. The system of claim 9, wherein said means to multiplex access to said upstream shared channel using ATM packet transmission techniques further comprises:

means to dynamically allocate the modes of operation as a function of collisions in said upstream channel.

13. A virtual connection media access control system for use in shared channel, shared media networks for controlling access to an upstream channel on the distribution portion of said network from terminals to a node to permit transmission of multimedia data comprising:

a controller at said node storing media access control protocols for access to a coaxial distribution network;

a plurality of terminals connected to said distribution network;

a downstream broadcast channel from said node to all of said terminals;

an upstream channel shared by said terminals to transmit ATM cells to said node;

a virtual connection in said upstream channel between at least one source of said ATM cells within each of said terminals and said distribution network;

said controller broadcasting a media access control cell periodically to said terminals;

said media access control cell including frame information in said downstream broadcast and assigning time slots within said frames for upstream transmissions from said terminals;

said terminals utilizing said media access control cell to determine transmission access times.

14. A virtual connection media access control system for use in shared channel, shared media networks for controlling access to an upstream channel on the distribution portion of said network from terminals to a node to permit transmission of multimedia data comprising:

a controller at said node storing media access control protocols for access to a coaxial distribution network;

a plurality of terminals connected to said distribution network;

a downstream broadcast channel from said node to all of said terminals;

an upstream channel shared by said terminals to transmit ATM cells to said node;

said controller broadcasting a media access control cell periodically to said terminals;

said media access control cell including frame information in said downstream broadcast and assigning time slots within said frames for upstream transmissions from said terminals;

said terminals utilizing said media access control cell to determine transmission access times;

means to specify modes of operation for upstream transmissions in time frames for said terminals;

means to establish a plurality of virtual connections between a fiber node and said terminals;

said media access control cell permitting contention frames for unknown virtual connections to said upstream channel; and means to verify receipt of transmissions to said fiber node from said virtual connections in said contention frames.

15. A method for providing media access control for a virtual connection in a shared medium network for controlling access to an upstream channel on the distribution portion of said network from terminals to a node to permit transmission of multimedia data, comprising the steps of:

storing media access control protocols in a controller at said node and in all said terminals;

broadcasting from said controller in a downstream broadcast channel from said node to all of said terminals a media access control cell periodically;

including frame information in said media access control cell in said downstream broadcast and assigning time slots within said frames for upstream transmissions from said terminals; [and]

utilizing said media access control cell at said terminals to determine transmission access times; and granting terminal transmission access times for the transmission of one or more cells addressed to said virtual connection from said terminal.

16. A method for providing media access control for a virtual connection in a shared medium network for controlling access to an upstream channel on the distribution portion of said network from terminal to a node to permit transmission of multimedia data, comprising the steps of:

storing media access control protocols in a controller at said node and in all said terminals;

broadcasting from said controller in a downstream broadcast channel from said node to all of said terminals a media access control cell periodically;

including frame information in said media access control cell in said downstream broadcast and assigning time slots within said frames for upstream transmissions from said terminals;

utilizing said media access control cell at said terminals to determine transmission access times;

specifying modes of operation for upstream transmissions in time frames for said terminals;

establishing a plurality of virtual connections between said node and said terminals;

permitting contention frames for unknown virtual connections to said upstream channel; and verifying receipt of transmissions to said node in said contention frames from said unknown virtual connections.

17. A method for providing media access control for a virtual connection in hybrid fiber/coaxial cable network for controlling access to an upstream channel on the coaxial distribution portion of said network from terminals to a fiber node to permit transmission of multimedia data, comprising the steps of:

storing media access control protocols in a controller at said fiber node and in all said terminals;

an upstream channel shared by said terminals to transmit ATM cells to said fiber node;

broadcasting from said controller in a downstream broadcast channel from said fiber node to all of said terminals a media access control cell periodically to said terminals;

including frame information in said media access control cell in said downstream broadcast and assigning time slots within said frames for upstream transmissions from said terminals;

utilizing said media access control cell at said terminals to determine transmission access times; and granting terminal transmission access times for the transmission of one or more ATM cells addressed to said virtual connection from said terminal.

18. A method for providing media access control for a virtual connection in hybrid fiber/coaxial cable network for controlling access to an upstream channel on the coaxial distribution portion of said network from terminals to a fiber node to permit transmission of multimedia data, comprising the steps of:

storing media access control protocols in a controller at said fiber node and in all said terminals;

an upstream channel shared by said terminals to transmit ATM cells to said fiber node;

broadcasting from said controller in a downstream broadcast channel from said fiber node to all of said terminals a media access control cell periodically to said terminals;

including frame information in said media access control cell said downstream broadcast and assigning time slots within said frames for upstream transmissions from said terminals;

utilizing said media access control cell at said terminals to determine transmission access times;

specifying modes of operation for upstream transmissions in time frames for said terminals;

establishing a plurality of virtual connections between said fiber node and said terminals;

permitting contention frames for unknown virtual connections to said upstream channel; and verifying receipt of transmissions to said fiber node in said contention frames from said unknown virtual connections.

19. The system of claim 1 wherein said shared upstream channel and said downstream broadcast channel are both unidirectional.

20. The system of claim 7 wherein said shared upstream channel and said downstream broadcast channel are both unidirectional.

* * * * *